United States Patent [19]

Gilchrist et al.

[11] Patent Number: 5,017,345
[45] Date of Patent: May 21, 1991

[54] METHOD OF PRODUCING URANIUM (IV) FLUORIDE

[75] Inventors: Paul Gilchrist, Fulwood; Graham Hodgson, Blackpool, both of United Kingdom

[73] Assignee: British Nuclear Fuels plc, Risley, United Kingdom

[21] Appl. No.: 396,642

[22] Filed: Aug. 22, 1989

[30] Foreign Application Priority Data

Sep. 9, 1988 [GB] United Kingdom ................ 8821189

[51] Int. Cl.$^5$ ........................................... C01G 43/06
[52] U.S. Cl. ...................................... 423/18; 423/259
[58] Field of Search ................... 423/258, 259, 20, 12, 423/10

[56] References Cited

U.S. PATENT DOCUMENTS

| 3,069,228 | 12/1962 | Davis et al. | 423/259 |
| 3,175,879 | 3/1965 | Townend et al. | 423/11 |
| 3,259,473 | 7/1966 | Hopkins et al. | 423/251 |
| 3,813,464 | 5/1974 | Ayers | 423/251 |
| 3,929,962 | 12/1975 | Shiah | 423/82 |
| 4,062,923 | 12/1977 | Takada et al. | 423/11 |
| 4,693,795 | 9/1987 | Eccles et al. | 204/94 |
| 4,699,769 | 10/1987 | Pollock | 423/20 |
| 4,837,375 | 6/1989 | Pollock | 423/20 |

Primary Examiner—Brooks H. Hunt
Assistant Examiner—Ngoclan T. Mai
Attorney, Agent, or Firm—William R. Hinds

[57] ABSTRACT

In a method of producing uranium (IV) fluoride, a feedstock comprising uranium metal or alloy is dissolved in hydrochloric acid and hydrofluoric acid to produce a clear solution. The solution is heated and excess hydrofluoric acid added to produce a precipitate comprising uranium (IV) fluoride.

10 Claims, 1 Drawing Sheet

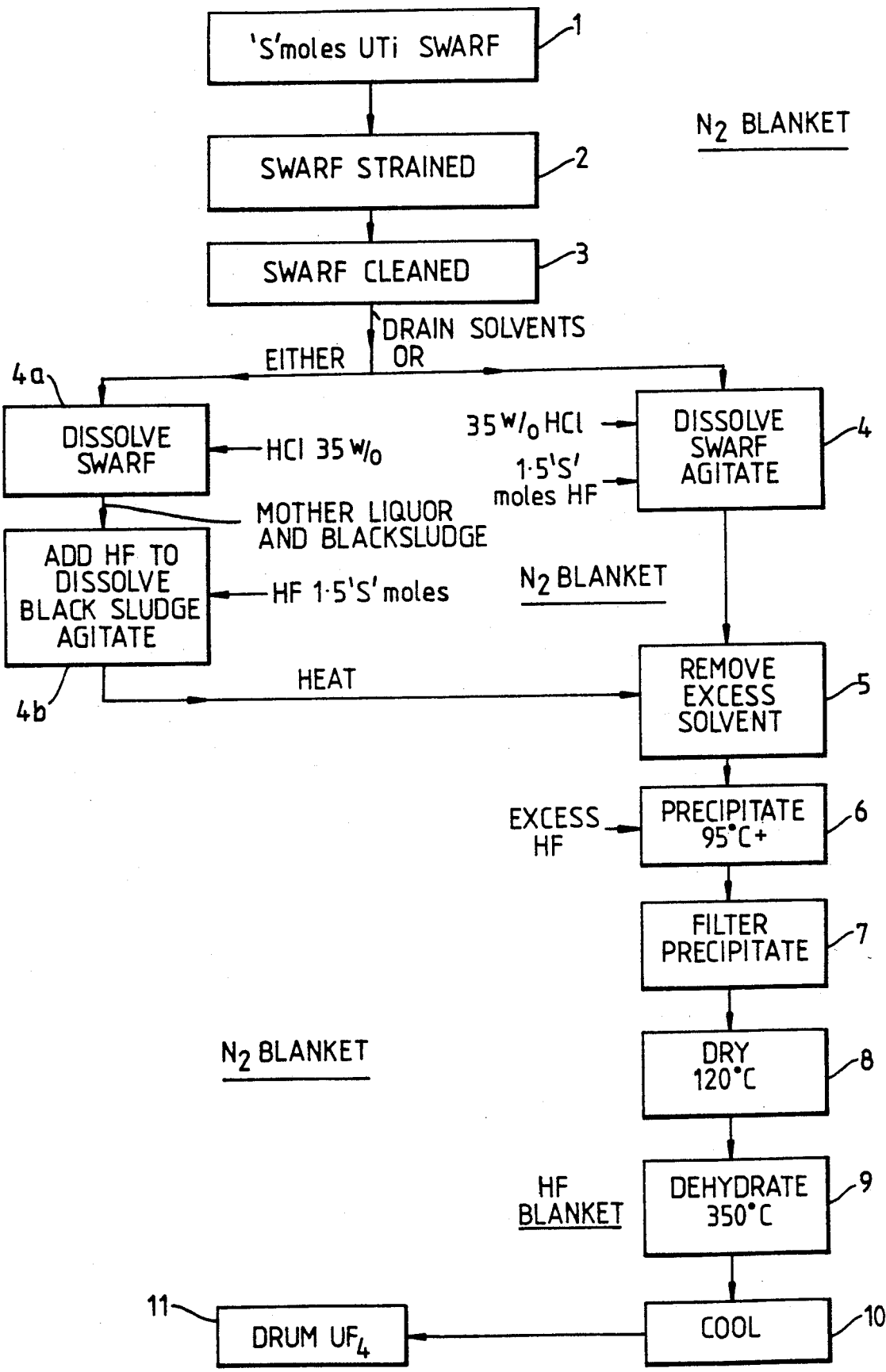

METHOD OF PRODUCING URANIUM (IV) FLUORIDE

This invention relates to a method of producing uranium (IV) fluoride from uranium metal or an alloy thereof.

According to the present invention, there is provided a method of producing uranium (IV) fluoride from a feedstock comprising uranium metal or an alloy thereof, the method comprising dissolving the feedstock in hydrochloric acid and hydrofluoric acid to produce a clear solution, and heating the solution and adding excess hydrofluoric acid to the solution to produce a precipitate comprising uranium (IV) fluoride.

Preferably, the method is performed in an inert environment, such as a nitrogen blanket.

The feedstock might be initially dissolved in the hydrochloric acid, the hydrofluoric acid being subsequently added to produce the clear solution, or the feedstock might be dissolved in a solution comprising hydrochloric acid and hydrofluoric acid.

Desirably, the excess hydrofluoric acid is added when the solution has been heated to at least 90° C., and preferably above 95° C.

The invention also includes uranium (IV) fluoride made by the method of the invention.

It will be understood that in the invention uranium (IV) fluoride includes hydrates thereof.

BRIEF DESCRIPTION OF THE DRAWING

The single drawing figure is a flow diagram diagramming the invention process of making $UF_4$.

The invention will now be further described by way of example only with reference to the Examples, and to the Flow Sheet in the accompanying drawing.

EXAMPLE 1

5.18 g UTi (0.75 w/o Ti) alloy swarf or fines was cleaned in stages in an ultrasonic bath by treatment with detergent/water, acetone, trichoroethylene and a solvent such as 112 trichloro 122 trifluoroethane, for example as supplied by Horgen Chemical Company. The swarf was then placed in a vessel fitted with a condenser and containing 200 mls 17.5 w/o HCl aqueous solution at ambient temperature. A black sludge was formed. After 90 minutes, 1.575 mls containing 0.03 moles HF was added to the vessel and the vessel was gently heated, the black sludge then dissolving. After 50 minutes the vessel was heated to 81° C., and excess HF was added to the vessel in the form of 6.83 mls containing 0.13 moles HF. A sea green coarse precipitate of 8.36 g U(IV) fluoride hydrate was produced in a yellow filtrate. The hydrate was removed by filtration and subsequently dried at about 120° C. The dried hydrate was dehydrated at about 350° C. in a HF blanket, and the anhydrous uranium (IV) fluoride allowed to cool under a nitrogen blanket.

EXAMPLE II 5.07 g UTi (0.75 w/o Ti) swarf or fines was cleaned and treated in a similar manner to that of Example I but under a nitrogen blanket and with the hydrochloric acid being degassed with nitrogen. The clear solution produced was heated to 67° C. when excess HF was added in the form of 0.13 moles HF to leave a colourless filtrate and a seagreen coarse precipitate of 6.75 g uranium (IV) fluoride hydrate. The hydrate was dried and dehydrated as in Example I.

EXAMPLE III 5.08 g of the UTi swarf or fines was cleaned and subsequently dissolved as in Example I. However, the excess HF provided by the 0.13 moles HF was added at 96° C. to produce a sea green precipitate of 5.37 g uranium (IV) fluoride hydrate which appeared to be finer and drier than the hydrate produced in Examples I and II, thus showing the benefit of adding the excess HF at the higher temperature. The filtrate was yellow as in Example I.

The above Examples with others show that optimum conditions to produce a preferred fine uranium (IV) fluoride hydrate appear to include a temperature above 90° C., preferably above 95° C., for adding the excess HF, and the use of an inert gas blanket. Analysis has shown that a recovery of at least 95% of the uranium in the feedstock can be achieved. The invention also has an advantage in that a uranium (VI) to uranium (IV) reduction stage should not be necessary with the invention being performed in a non-oxidising environment.

Reference is now made to the Flow Sheet which shows a complete conversion of UTi swarf as feedstock to anhydrous uranium (IV) fluoride product.

| Stage | Discussion |
| --- | --- |
| 1. | 'S' moles of UTi (0.75 w/o Ti) swarf as feedstock. |
| 2. | Swarf placed over wire mesh and allowed to drain. |
| 3. | Swarf cleaned using detergent/ water, acetone, trichoroethylene and 112 trichloro 122 trifluoroethane solvent, and solvents discarded |
| Either: | |
| 4a | Swarf dissolved in 35 w/o hydrochloric acid, with gentle heat and agitation to produce a black sludge in a mother liquor. |
| 4b | 1.5 'S' moles of dilute hydrofluoric acid added and agitated until the black sludge dissolves to leave a clear solution |
| Or: | |
| 4. | Swarf dissolved in 35 w/o hydrochloric acid containing 1.5 'S' moles of dilute hydrofluoric acid. Gentle heat applied and solution agitated until all the swarf dissolves and a clear solution produced |
| 5. | Liquor from Stage 4 or Stage 4b transferred to settling tank with interface detection to remove excess solvent. |
| 6. | Batches of the clear solution remaining from Stage 5 transferred to a precipitator and heated above 95° C. Excess dilute hydrofluoric acid added. Solution Agitated. |
| 7. | The uranium (IV) fluoride hydrate precipitate produced in |

| Stage | Discussion |
|---|---|
|  | Stage 6 filtered. |
| 8. | The uranium (IV) fluoride hydrate dried in a fluid bed drier at 120° C. |
| 9. | The hydrate from Stage 8 dehydrated at 350° C. under a HF blanket. |
| 10. | The anhydrous uranium (IV) fluoride cooled under a nitrogen blanket. |
| 11. | The cooled anhydrous uranium (IV) fluoride bulked and retained in sealed drums. |

Except for Stage 9 the above Stages are performed under a nitrogen blanket.

It will be understood that alternative feedstocks may be used in the Flow Sheet such as uranium metal, or suitable uranium alloys.

We claim:

1. A method of producing uranium (IV) fluoride from a feedstock comprising uranium metal or an alloy thereof, the method comprising dissolving the feedstock in an aqueous solution consisting essentially of hydrochloric acid and a controlled quantity of hydrofluoric acid in relation to the quantity of uranium in the feedstock effective to produce a clear solution, and heating the clear solution and adding excess hydrofluoric acid to the clear solution to produce a precipitate comprising uranium (IV) fluoride.

2. A method as claimed in claim 1, wherein the feedstock is initially dissolved in the hydrochloric acid, the hydrofluoric acid being subsequently added to produce the clear solution.

3. A method as claimed in claim 1, wherein the feedstock is dissolved in a solution comprising hydrochloric acid and hydrofluoric acid.

4. A method as claimed in claim 1, wherein the excess hydrofluoric acid is added when the solution has been heated to at least 90° C.

5. A method as claimed in claim 4, wherein the solution is heated to above 95° C.

6. A method as claimed in claim 4, wherein the method is performed in an inert environment.

7. A method as claimed in claim 6, wherein the inert environment comprises nitrogen.

8. A method of producing uranium (IV) fluoride from a feedstock comprising uranium metal, the method comprising dissolving 'S' moles of uranium metal swarf in 35 w/o hydrochloric acid, adding 1.5 'S' moles of dilute hydrofluoric acid to leave a clear solution, heating the clear solution to above 95° C., adding excess dilute hydrofluoric acid to the clear solution to precipitate uranium (IV) fluoride, drying the precipitate at about 120° C., dehydrating the dried precipitate at about 350° C. under a HF blanket, and allowing the dehydrated precipitate to cool under a nitrogen blanket.

9. A method of producing uranium (IV) fluoride from a feedstock comprising uranium metal or an alloy thereof, the method comprising, in an inert environment, dissolving the feedstock in hydrochloric acid and hydrofluoric acid to produce a clear solution, heating the solution to at least 90° C., adding excess hydrofluoric acid to the heated solution to produce a precipitate comprising uranium (IV) fluoride, and drying the precipitate, and subsequently dehydrating the dried precipitate under a hydrogen fluoride blanket, and allowing the dehydrated precipitate to cool under a nitrogen blanket.

10. A method as claimed in claim 1, wherein the feedstock comprises 'S' moles of uranium metal or an alloy thereof, and the controlled quantity of hydrofluoric acid comprises about 1.5 'S' moles thereof.

* * * * *